C. E. HIATT.
ELECTRICAL MEASURING APPARATUS.
APPLICATION FILED MAY 25, 1909.
1,121,834.
Patented Dec. 22, 1914.
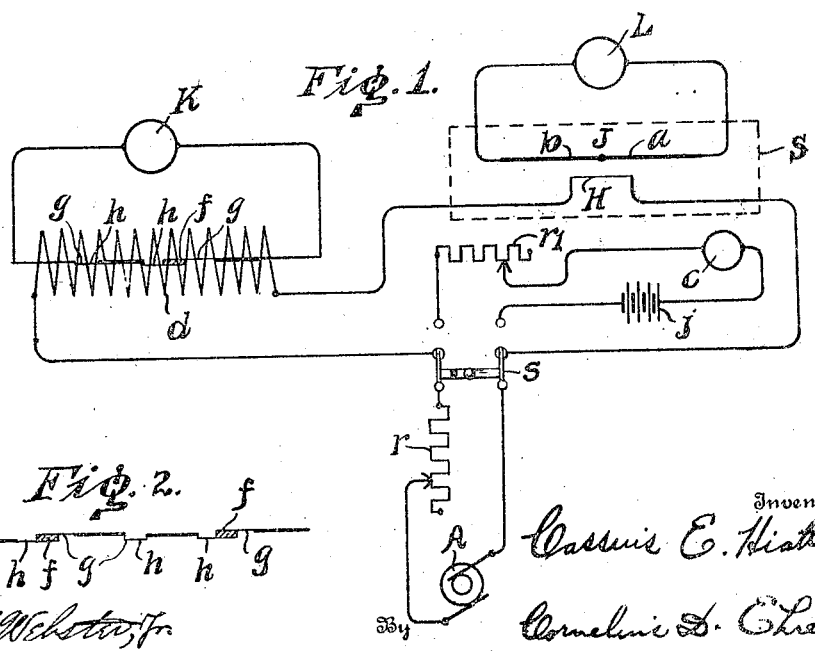

UNITED STATES PATENT OFFICE.

CASSIUS E. HIATT, OF PHILADELPHIA, PENNSYLVANIA, ASSIGNOR TO WESTING-HOUSE ELECTRIC & MANUFACTURING COMPANY, A CORPORATION OF PENNSYLVANIA.

ELECTRICAL MEASURING APPARATUS.

1,121,834.   Specification of Letters Patent.   Patented Dec. 22, 1914.

Application filed May 25, 1909. Serial No. 498,160.

*To all whom it may concern:*

Be it known that I, CASSIUS E. HIATT, a citizen of the United States, residing in the city of Philadelphia, county of Philadelphia, and State of Pennsylvania, have invented a new and useful Electrical Measuring Apparatus, of which the following is a specification.

My invention relates to electrical measuring apparatus and more particularly measuring apparatus involving the use of thermo junctions which, when heated, produce, as is well understood, an electric current; and such electric current I employ to produce an effect which shall be a measure of the unknown quantity.

My invention resides in a frequency meter wherein a thermo junction is raised in temperature by the heat produced by hysteresis in a mass subjected to a magnetic or electric field changing with a frequency equal or proportional to the frequency to be measured.

My invention resides also in the method of measuring frequency.

For an illustration of some of the forms my invention may take, reference is to be had to the accompanying drawing, in which:

Figure 1 is a diagrammatic illustration of means for measuring the frequency of an alternating or fluctuating current. Fig. 2 is illustrative of a plurality of pairs of thermo junctions useful in connection with the apparatus of Fig. 1.

In Fig. 1 A represents a source of fluctuating or alternating current whose frequency is to be measured. As shown, it is connected in series with the adjustable non-inductive resistance $r$ through the switch $s$, the heater H and the coil $d$ all in series. The alternating current flowing through the coil $d$ sets up an alternating magnetic field which acts upon the small mass $f$, of iron, steel, nickel, alloy, or other suitable material, to carry the same through cycles of magnetization developing therein heat due to hysteresis. This small mass of iron or other material $f$ is at a thermo junction composed, for example, of copper $g$ and constantan $h$. In series with this same thermo junction is a similar thermo junction to the left composed also of copper and constantan but connected in opposition to the first mentioned junction. These junctions are then connected in series with each other and the indicating instrument K, as a galvanometer, voltmeter, or other suitable device. The thermo junctions are preferably made very delicate so as to respond quickly to changes in temperature and the masses of material at the junctions are made very small and so arranged that heat is quickly conducted away from them.

The alternating magnetic field acts, as above stated, to raise the temperature of the small mass of material $f$, which temperature bears a relation to the frequency of the alternating current passing through the coil $d$. The current passing through the coil $d$, however, necessarily raises the temperature of the coil $d$ itself and this temperature would be added to the temperature due to the hysteresis and, therefore, causes the junction at the mass $f$ to rise to a temperature higher than that due to hysteresis only. But the other junction at the left is raised only to the temperature due to the heating effect of the current in the coil $d$, and, therefore, its electro-motive force is subtracted from the electro-motive force of the right hand junction and the resultant current through the instrument K is due only to the rise in temperature due to hysteresis. In other words, the current through the instrument K is a function of the frequency of the source A. This is true because the heat due to eddy currents produced in the mass $f$ and its connections within the field of the coil $d$ have been found to be negligible; or, at any rate, they can be compensated for or the calibration of the instrument may take the effect of these eddy currents into consideration. This instrument K may be then calibrated to read directly in frequency units.

The resistance of the coil $d$ produces a heating effect within the coil equal to the square of the current times the resistance. The temperature due to this heating effect is seldom, in practice, uniform throughout the length of the coil, but there is what is called a "temperature gradient." Furthermore, the metals constituting the thermo couples are connected at their ends to other conductors of high heat conductivity which serve to rapidly conduct heat away from one end of each couple. This serves to cause a temperature gradient along the metals constituting the conductor extending through the coil. By reason of these two causes of temperature gradients, there is a tendency to cause a difference in temperature between the united ends of the metals constituting the couples and their other ends. Thus, the conditions that exist within the coil may be such, and, in practice, often are such, as to cause the junctions to produce electro-motive forces due to the current passing through the resistance of the coil. Therefore, in order that the device may give an indication of the frequency only, it is necessary that the thermo electromotive forces produced by the current passing through the resistance of the coil be eliminated. This is done by providing two thermo couples one of which opposes the other.

As shown in Fig. 2, a plurality of pairs of opposed junctions are connected in series and all disposed within the field of the coil traversed by the alternating current whose frequency is to be measured. By this means the effective voltage upon the instrument K may be increased, but nevertheless corrected for the heat generated in the coil $d$. By thus increasing the number of pairs of thermo junctions a low reading voltmeter may be employed and directly calibrated in units of frequency so that the apparatus becomes direct reading.

As above stated, the mass $f$ is relatively small and it may be only a few milligrams.

Rapidity of action is secured by making the heat capacity of the thermo junctions small and their radiating power high. This is compatible with the practical requirement that the energy consumption of the measuring instrument shall be small. I have used in practice for the thermo junctions constantan wire of No. 27 B. & S. gage and for the copper a No. 32 B. & S. gage wire, though I do not wish to be limited in this regard.

For keeping the alternating current through the solenoid $d$ of constant and known value a comparator is used consisting of a thermo junction of bismuth and antimony, for example, $b$ and $a$ respectively, forming the junction J, Fig. 1. This junction is placed near the heater H, of manganin, for example. The heater H may be made to approach or recede from the junction J. The effect of the heater H upon the junction J may be varied as by bringing them closer together or removing them from each other, or a shield, as of mica, may be introduced partially or wholly between them. The junction J and the heater H are preferably placed within a heavy heat shield S. By throwing the switch $s$ upwardly the source of alternating current A is disconnected and the source of direct current $j$ in series with the direct current ammeter $c$ and the adjustable resistance $r'$ are brought into series with the heater H and the solenoid $d$.

With the desired current strength flowing through the heater H from the source $j$ the galvanometer or other instrument L gives a certain deflection due to the thermo junction J. Then, when the switch $s$ is thrown down to bring the source A into circuit the resistance $r$ is adjusted until the instrument L gives the same deflection as before. Then the current strength through the solenoid $d$ is known and, therefore, the intensity of the magnetic field is controllable.

The frequency meter comprising the instrument K, the solenoid $d$, and the thermo junctions surrounded thereby may be standard and portable if the instrument is always to be used on an alternating current circuit of given voltages. For in such case, the circuit including the solenoid $d$ may include so great a non-inductive resistance that the difference between true resistance and apparent resistance at different frequencies may be practically nothing. In such case, then, the density of the magnetic field produced by the coil $d$ will always be substantially the same. As before stated, different materials may be used for the mass $f$ and any suitable alloy having definite hysteretic properties may be used. It is to be understood that the frequency to be measured may be as low as used on commercial circuits, for example, 60 cycles, or may be very high indeed. I have, in fact, measured frequencies with this apparatus as high as 1500 cycles per second. And by suitably calibrating the instrument K any frequency may be measured even such high frequencies as result from oscillatory discharges and such as used in wireless telegraphy or telephony.

While in Fig. 1 I have shown a frequency meter depending upon the heat produced by magnetic hysteresis, it is to be understood that my arrangement is applicable also for use in the case where dielectric hysteresis produces the heat operating upon the thermo junctions.

What I claim is:

1. A frequency meter comprising a winding traversed by a current whose frequency is dependent upon the frequency to be measured, similar opposed thermo junctions subjected to the heat produced by the current in said winding, an indicating instrument connected in circuit with said thermo junctions, and hysteretic material disposed in the magnetic field of said winding and delivering heat to one of said thermo junctions.

2. An electrical measuring instrument comprising a winding, a thermo junction of small mass and connections therefor for quickly conducting heat away from said junction, a small mass of hysteretic material communicating heat to said junction and disposed within the magnetic field produced by said winding, and an instrument for indicating the current produced in said thermo junction.

3. An electrical measuring instrument comprising a winding, a thermo junction, a circuit including said thermo junction and an instrument for indicating the current produced by said thermo junction, and a body of hysteretic material disposed in the magnetic field produced by said winding the mass of which is so small that substantially no eddy currents are produced therein over a wide range of frequencies, said hysteretic material being in contact with the elements of said thermo junction.

4. An electrical measuring instrument comprising a winding, a thermo junction, a circuit including said thermo junction and an instrument for indicating the current produced by said thermo junction, and a body of hysteretic material disposed in the magnetic field produced by said winding the mass of which is so small that substantially no eddy currents are produced therein over a wide range of frequencies, said body of hysteretic material being in contact with the elements of said thermo junction and included in circuit therewith.

5. An electrical measuring instrument comprising a winding, opposed thermo junctions subjected to the heat produced in said winding when the same is traversed by current, said thermo junctions producing equal potentials when subjected to equal temperatures, a circuit including said thermo junctions and a current indicating instrument, and a mass of hysteretic material subjected to the magnetic field produced by said winding, one of said thermo junctions being subjected to the heat generated in said hysteretic material.

6. An electrical measuring instrument comprising a winding, similar opposed thermo junctions disposed within said winding, a circuit including said thermo junctions and a current indicating instrument, and a mass of hysteretic material delivering heat to one of said junctions and disposed in the magnetic field produced by said winding.

7. An electrical measuring instrument comprising a winding, delicate thermo junctions and connections therefor for quickly conducting heat away therefrom disposed in proximity to said winding, a circuit including said thermo junctions in opposition to each other and a current indicating instrument, and a small mass of hysteretic material disposed at one of said thermo junctions in the magnetic field produced by said winding.

8. An electrical measuring instrument comprising a winding, a plurality of pairs of thermo junctions associated with said winding, a circuit including said pairs of thermo junctions serially connected with each other and including a current indicating instrument, the thermo junctions of each pair being connected in opposition to each other, and a mass of hysteretic material associated with a junction of each pair, said masses of hysteretic material disposed within the magnetic field produced by said winding.

9. A frequency meter comprising a magnetizing winding, opposed thermo junctions subjected to the $C^2R$ heat produced in said winding, a mass of hysteretic material disposed within the field of said winding, one of said junctions subjected to the heat produced in said mass, and a current indicating instrument in circuit with said thermo junctions.

10. The method of determining the frequency of an alternating current which consists in subjecting magnetic material to a field produced by said current, applying the heat produced by the hysteresis of the said material to one of two opposing thermocouples within the said field, and measuring the resultant thermo electric current.

11. A frequency meter comprising a winding, a body of magnetizable material in the field produced by said winding the mass of which is so small that substantially no eddy currents are produced therein over a wide range of frequencies, a thermo-couple heated by said body, and means for measuring the current produced by the thermo-couple.

In testimony whereof I have hereunto affixed my signature in the presence of the two subscribing witnesses.

CASSIUS E. HIATT.

Witnesses:
 DANIEL WEBSTER, Jr.,
 A. E. STEINBOCK.